(12) United States Patent
Sjöland et al.

(10) Patent No.: US 10,027,465 B2
(45) Date of Patent: **\*Jul. 17, 2018**

(54) TRANSCEIVER ARRANGEMENT, COMMUNICATION DEVICE, METHOD AND COMPUTER PROGRAM

(71) Applicant: Telefonaktiebolaget L M Ericsson (publ), Stockholm (SE)

(72) Inventors: Henrik Sjöland, Lund (SE); Stefan Andersson, Flyinge (SE); Johan Wernehag, Malmö (SE)

(73) Assignee: Telefonaktiebolaget LM Ericsson, Stockholm (SE)

( \* ) Notice: Subject to any disclaimer, the term of this patent is extended or adjusted under 35 U.S.C. 154(b) by 279 days.

This patent is subject to a terminal disclaimer.

(21) Appl. No.: 14/785,898

(22) PCT Filed: Apr. 26, 2013

(86) PCT No.: PCT/EP2013/058774
§ 371 (c)(1),
(2) Date: Oct. 21, 2015

(87) PCT Pub. No.: WO2014/173459
PCT Pub. Date: Oct. 30, 2014

(65) Prior Publication Data
US 2016/0065352 A1 Mar. 3, 2016

(51) Int. Cl.
*H01P 5/12* (2006.01)
*H04L 5/14* (2006.01)
*H04B 1/525* (2015.01)

(52) U.S. Cl.
CPC ............... *H04L 5/14* (2013.01); *H04B 1/525* (2013.01)

(58) Field of Classification Search
CPC .................................. H04L 5/14; H04B 1/525
(Continued)

(56) References Cited

U.S. PATENT DOCUMENTS

| 404,375 A | 6/1869 | Bain |
| 3,900,823 A | 8/1975 | Sokal et al. |

(Continued)

FOREIGN PATENT DOCUMENTS

| CN | 102332931 A | 1/2012 |
| EP | 0388927 A1 | 9/1990 |

(Continued)

OTHER PUBLICATIONS

Pursula, P. et al., "Hybrid Transformer-Based Adaptive RF Front End for UHF RFID Mobile Phone Readers", 2008 IEEE International Conference on RFID, The Venetian, Las Vegas, US, Apr. 16, 2008, pp. 151-155, IEEE.

(Continued)

*Primary Examiner* — Robert J Pascal
*Assistant Examiner* — Kimberly Glenn
(74) *Attorney, Agent, or Firm* — Coats & Bennett, PLLC

(57) ABSTRACT

A transceiver arrangement comprises a receiver arranged for frequency-division duplex communication with a communication network; a transmitter arranged for frequency-division duplex communication with the communication network; an transmission port for connecting to an antenna; a balancing impedance circuit arranged to provide an adaptive impedance arranged to mimic the impedance at the transmission port; and a filtering arrangement, which comprises filters of a first type and filters of a second type, connecting the receiver, transmitter, transmission port and balancing impedance circuit. The filters of the first type are arranged to pass signals at transmitter frequency and attenuate signals at receiver frequency and are connected between the transmitter and the transmission port and between the receiver and the balancing impedance circuit. The filters of the second type are arranged to attenuate signals at transmitter frequency and pass signals at receiver frequency and (Continued)

are connected between the transmitter and the balancing impedance circuit and between the receiver and the transmission port. A communication device, a method of operating the transceiver, and a computer program are also disclosed.

16 Claims, 5 Drawing Sheets

(58) Field of Classification Search
USPC .......................................................... 333/126
See application file for complete search history.

(56) References Cited

U.S. PATENT DOCUMENTS

| | | |
|---|---|---|
| 4,325,140 A | 4/1982 | Stitzer |
| 5,404,375 A | 4/1995 | Kroeger et al. |
| 6,169,912 B1 | 1/2001 | Zuckerman |
| 6,567,648 B1 | 5/2003 | Ahn et al. |
| 6,567,649 B2 | 5/2003 | Souissi |
| 6,745,018 B1 | 6/2004 | Zehavi et al. |
| 7,109,793 B2 | 9/2006 | Nakatani et al. |
| 7,756,480 B2 | 7/2010 | Loh |
| 8,654,743 B1 | 2/2014 | Li et al. |
| 8,797,927 B2 | 8/2014 | Chen |
| 8,909,161 B2 | 12/2014 | Din et al. |
| 9,143,186 B2 | 9/2015 | Andersson et al. |
| 9,344,139 B2 | 5/2016 | Sjoland et al. |
| 2003/0008693 A1 | 1/2003 | Tanaka et al. |
| 2003/0128081 A1 | 7/2003 | Ella et al. |
| 2003/0193997 A1 | 10/2003 | Dent et al. |
| 2004/0180633 A1 | 9/2004 | Nakatani et al. |
| 2005/0035824 A1 | 2/2005 | Kearns |
| 2005/0046585 A1 | 3/2005 | Dodge |
| 2005/0170790 A1 | 8/2005 | Chang et al. |
| 2006/0028298 A1 | 2/2006 | Nakamura et al. |
| 2006/0133599 A1 | 6/2006 | Pagnanelli |
| 2006/0135084 A1 | 6/2006 | Lee |
| 2006/0261902 A1 | 11/2006 | Masuda et al. |
| 2007/0015468 A1 | 1/2007 | Kuoki et al. |
| 2007/0117524 A1 | 5/2007 | Do |
| 2007/0152904 A1 | 7/2007 | Castaneda et al. |
| 2007/0182509 A1 | 8/2007 | Park et al. |
| 2007/0202826 A1 | 8/2007 | Dean |
| 2007/0207747 A1 | 9/2007 | Johnson et al. |
| 2007/0217488 A1 | 9/2007 | Smaini et al. |
| 2008/0198773 A1 | 8/2008 | Loh |
| 2008/0238789 A1 | 10/2008 | Wilcox |
| 2008/0242235 A1 | 10/2008 | Adler et al. |
| 2008/0279262 A1 | 11/2008 | Shanjani |
| 2009/0028074 A1 | 1/2009 | Knox |
| 2009/0253385 A1 | 10/2009 | Dent et al. |
| 2009/0289739 A1 | 11/2009 | Sasaki et al. |
| 2010/0035563 A1 | 2/2010 | Mikhemar et al. |
| 2010/0109800 A1 | 5/2010 | Ueda et al. |
| 2010/0148886 A1 | 6/2010 | Inoue et al. |
| 2010/0159837 A1* | 6/2010 | Dent ..................... H04B 1/525 455/63.1 |
| 2010/0253477 A1 | 10/2010 | Seppä et al. |
| 2010/0279617 A1 | 11/2010 | Osman |
| 2010/0304701 A1 | 12/2010 | Jung et al. |
| 2011/0064004 A1 | 3/2011 | Mikhemar et al. |
| 2011/0064005 A1 | 3/2011 | Mikhemar et al. |
| 2011/0124309 A1 | 5/2011 | Trotta et al. |
| 2011/0158134 A1 | 6/2011 | Mikhemar et al. |
| 2011/0175789 A1 | 7/2011 | Lee et al. |
| 2011/0187478 A1 | 8/2011 | Link et al. |
| 2011/0199142 A1 | 8/2011 | Mu |
| 2011/0221521 A1 | 9/2011 | Razzell et al. |
| 2011/0299433 A1 | 12/2011 | Darabi |
| 2011/0299437 A1 | 12/2011 | Mikhemar et al. |
| 2012/0009886 A1 | 1/2012 | Poulin |
| 2012/0126907 A1 | 5/2012 | Nakamoto et al. |
| 2012/0195351 A1 | 8/2012 | Banwell et al. |
| 2013/0063223 A1 | 3/2013 | See et al. |
| 2013/0077540 A1 | 3/2013 | Black et al. |
| 2013/0176912 A1 | 7/2013 | Khlat |
| 2013/0194978 A1* | 8/2013 | Andersson ............... H04B 1/50 370/278 |
| 2013/0258911 A1 | 10/2013 | Choksi |
| 2013/0271004 A1 | 10/2013 | Min et al. |
| 2013/0315116 A1 | 11/2013 | Chen |
| 2014/0169231 A1 | 6/2014 | Mikhemar et al. |
| 2014/0169235 A1 | 6/2014 | Mikhemar et al. |
| 2014/0253236 A1 | 9/2014 | Cheeranthodi et al. |
| 2014/0315501 A1* | 10/2014 | Rudell ................. H04B 1/0458 455/78 |
| 2014/0364073 A1 | 12/2014 | Sjoland |
| 2014/0376419 A1 | 12/2014 | Goel et al. |
| 2015/0156005 A1 | 6/2015 | Sjoland et al. |
| 2015/0281974 A1 | 10/2015 | Ghasemzadeh et al. |
| 2015/0303981 A1 | 10/2015 | Sjoland et al. |
| 2016/0043767 A1 | 2/2016 | Andersson et al. |
| 2016/0072542 A1 | 3/2016 | Din et al. |
| 2016/0294436 A1 | 10/2016 | Din et al. |

FOREIGN PATENT DOCUMENTS

| | | |
|---|---|---|
| EP | 1813030 A1 | 8/2007 |
| EP | 2226948 A1 | 9/2010 |
| EP | 2296286 A2 | 3/2011 |
| EP | 2388927 A2 | 11/2011 |
| EP | 2672631 A1 | 12/2013 |
| RU | 2264032 C2 | 11/2005 |
| WO | 2006068635 A1 | 6/2006 |
| WO | 2007149954 A1 | 12/2007 |
| WO | 2009080878 A1 | 7/2009 |
| WO | 2011146404 A1 | 11/2011 |
| WO | 2014173459 A1 | 10/2014 |
| WO | 2014177191 A1 | 11/2014 |

OTHER PUBLICATIONS

Mikhemar, M., et al., "A Tunable Integrated Duplexer with 50dB Isolation in 40nm CMOS", IEEE International Solid-State Circuits Conference—Digest of Technical Papers, Feb. 8, 2009, 386-387,387a, San Francisco, CA, IEEE.

Mikhemar, M., et al., "An On-Chip Wideband and Low-Loss Duplexer for 3G/4G CMOS Radios", 2010 IEEE Symposium on VLSI Circuits (VLSIC), Technical Digest of Technical Papers, Jun. 16, 2010, pp. 129-130, IEEE.

Larson, L., et al., "4th Generation Wireless Transceiver Design", Bipolar/BiCMOS Circuits and Technology Meeting (BCTM), Oct. 4, 2010, pp. 113-120, IEEE.

Elzayat, A., et al., "Tx/Rx Isolation Enhancement Based on a Novel Balanced Duplexer Architecture", 2011 IEEE MTT-S International Microwave Symposium Digest, Jun. 5, 2011, pp. 1-4, IEEE.

* cited by examiner

TRANSCEIVER ARRANGEMENT, COMMUNICATION DEVICE, METHOD AND COMPUTER PROGRAM

TECHNICAL FIELD

The present invention generally relates to a transceiver. The present invention also relates to a communication device capable of frequency division duplex communication comprising such a transceiver. The present invention also relates to a method of operating such a transceiver, and a computer program for implementing the method.

BACKGROUND

Transceivers comprise both a transmitter and a receiver, and are commonly used in a variety of communication apparatuses. Transceivers can be arranged to be operated in semi-duplex, i.e. the receiver and transmitter operate separated in time to prevent the transmitter signal from concealing the received signal. This approach is therefore commonly referred to as time division duplex (TDD). Transceivers can also be operated in full duplex, i.e. the receiver and transmitter operate simultaneously wherein some special arrangements are provided to prevent the transmitter from concealing the received signal. One approach to achieve this is to assign different frequencies for transmission and reception. This approach is therefore commonly referred to as frequency division duplex (FDD).

Often the receiver and the transmitter use the same antenna, or antenna system which may comprise several antennas, which implies that some kind of circuitry may be desired to enable proper interaction with the antenna. This circuitry should be made with certain care when operating the transceiver in full duplex since the transmitter signal, although using FDD, may interfere with the received signal, i.e. internal interference within the transceiver. FIG. 1 illustrates an example of a communication apparatus 100 comprising a transceiver 102, an antenna 104 connected to the transceiver 102, and further circuitry 106 such as processing means, input and output circuitry, and memory means. The transceiver 102 comprises a transmitter 108, a receiver 110, and a duplexer 112 which is connected to the transmitter 102, the receiver 110 and the antenna 104. The duplexer 112 is arranged to direct radio frequency (RF) signal from the transmitter to the antenna, as indicated by arrow 114, and from the antenna to the receiver, as indicated by arrow 116, and can for example comprise a circulator. Duplexers are known in the art and for example described in U.S. Pat. No. 4,325,140. However, duplexers are not ideal and a leakage of transmitter signals from the transmitter to the receiver, as indicated by arrow 118, is at least to some degree present. Further, duplexers are commonly costly, space consuming and challenging to be implemented on-chip. Therefore, efforts have been made in the art to achieve the similar effects with on-chip solutions. These are based on electrical balance by using a dummy load which is arranged to be equal to the antenna impedance. FIG. 2 illustrates an example of such a structure 200, which is also disclosed in WO 2009/080878 A1, comprising a transmitter 202, a receiver 204, and an antenna 206. The transmitter 202 provides its output signal both to a branch towards the antenna 206, the branch comprising a capacitor 208 and an inductor 210, and to a branch towards a dummy load 212, the branch comprising a capacitor 208' and an inductor 210'. The dummy load 212 is arranged to mimic the impedance of the antenna 206, and by the achieved symmetry, and, when using a differential input to the receiver 204 via a transformer 214, the contribution at the receiver input from the transmitted signal can be suppressed.

SUMMARY

An object of the invention is to at least alleviate the above stated problem. The present invention is based on the understanding that counteracting contribution from a transmitter at a receiver input in a transceiver reduces or cancels signal. The inventors have found that contribution by the transmitter signal at the receiver input via one branch can be counteracted by the contribution by the transmitter signal at the receiver input via another branch including a cross connection, wherein the aggregate contribution by the transmitter signal at the receiver input is ideally zero. By a filtering structure, less transmitter energy is lost in the dummy load. In a similar way, less received signal is lost in the dummy load.

According to a first aspect, there is provided a transceiver arrangement comprising a receiver arranged for frequency-division duplex communication with a communication network; a transmitter arranged for frequency-division duplex communication with the communication network; an transmission port for connecting to an antenna; a balancing impedance circuit arranged to provide an adaptive impedance arranged to mimic the impedance at the transmission port; and a filtering arrangement, which comprises filters of a first type and filters of a second type, connecting the receiver, transmitter, transmission port and balancing impedance circuit. The filters of the first type are arranged to pass signals at transmitter frequency and attenuate signals at receiver frequency and are connected between the transmitter and the transmission port and between the receiver and the balancing impedance circuit. The filters of the second type are arranged to attenuate signals at transmitter frequency and pass signals at receiver frequency and are connected between the transmitter and the balancing impedance circuit and between the receiver and the transmission port.

The transceiver arrangement may further comprise a connection network which includes a differential cross-connection and the filtering arrangement differentially connecting the receiver, transmitter, transmission port and balancing impedance circuit. The transceiver arrangement may further comprise an amplitude detector arrangement at terminals of an input port of the receiver, wherein the transceiver arrangement further may comprise a controller arranged to control the adaptive impedance of the balancing impedance circuit such that the amplitude at terminals of the input port of the receiver is minimised based on measurement by the amplitude detector arrangement.

The transceiver arrangement may further comprise a connection network which includes the filtering arrangement connecting the receiver, transmitter, transmission port and balancing impedance circuit by a first transformer arrangement having a primary winding connected to the transmitter, and a secondary winding connected via one of the filters of the first type to a terminal of the transmission port and via one of the filters of the second type to a terminal of the balancing impedance circuit. A second transformer arrangement of the connection network has a primary winding connected to another one of the filters of the second type, which filter is connected to the terminal of the transmission port, and to another one of the filters of the first type, which filter is connected to the terminal of the balancing impedance circuit, and a secondary winding connected to the receiver. The primary winding of the first transformer arrangement may be connected between a single-ended output of the transmitter and a first reference voltage point, and the secondary winding may comprise a first partial winding connected between the filter of the first type and a second reference voltage point, and a second partial winding connected between the filter of the second type and the second reference voltage point. The secondary winding of the second transformer arrangement may be connected between a single-ended input of the receiver and a third reference voltage point, and the primary winding of the second transformer arrangement may comprise a first partial winding connected between the filter of the first type and a fourth reference voltage point, and a second partial winding connected between the filter of the second type and the fourth reference voltage point. The first and second partial windings of one of the first and second transformer arrangements may be wound to give mutually aggregate magnetic field and the first and second partial windings of the other one of the first and second transformer arrangements may be wound to give mutually opposite magnetic field. The transceiver arrangement may further comprise an amplitude detector arrangement at a terminal or terminals of an input port of the receiver or at terminals of the primary winding, wherein the transceiver arrangement further may comprise a controller arranged to control the adaptive impedance of the balancing impedance circuit such that the amplitude at the terminal or terminals of an input port of the receiver or at terminals of the primary winding is minimised based on measurements by the amplitude detector arrangement.

The filters of the first type may each comprise a capacitance and a first inductance coupled in parallel where the parallel coupling is coupled in series with a second inductance, and the filters of the second type may each comprise a first capacitance and an inductance coupled in parallel, where the parallel coupling is coupled in series with a second capacitance. At least one of the capacitance and the first and second inductances of each of the filters of the first type may be controllable and may then be controlled by a controller, and at least one of the inductance and the first and second capacitances of each of the filters of the second type may be controllable and may then be controlled by the controller.

The filters of the first type may each comprise a first capacitance and an inductance coupled in parallel, where the parallel coupling is coupled in series with a second capacitance, and the filters of the second type may each comprise a capacitance and a first inductance coupled in parallel where the parallel coupling is coupled in series with a second inductance. At least one of the inductance and the first and second capacitances of each of the filters of the first type may be controllable and are controlled by a controller, and at least one of the capacitance and the first and second inductances of each of the filters of the second type may be controllable and are controlled by the controller.

According to a second aspect, there is provided a communication device, capable of frequency division duplex communication via a communication network, comprising a transceiver arrangement according to the first aspect.

According to a third aspect, there is provided a method of controlling a transceiver arrangement comprising a receiver arranged for frequency-division duplex communication with a communication network, a transmitter arranged for frequency-division duplex communication with the communication network, an transmission port for connecting to an antenna, a balancing impedance circuit arranged to provide an adaptive impedance arranged to mimic the impedance at the transmission port, and a filtering arrangement, which comprises filters of a first type and filters of a second type, connecting the receiver, transmitter, transmission port and balancing impedance circuit, wherein the filters of the first type are arranged to pass signals at transmitter frequency and attenuate signals at receiver frequency and are connected between the transmitter and the transmission port and between the receiver and the balancing impedance circuit, the filters of the second type are arranged to attenuate signals at transmitter frequency and pass signals at receiver frequency and are connected between the transmitter and the balancing impedance circuit and between the receiver and the transmission port. The method comprises measuring amplitude at terminals of an input port of the receiver; and adjusting the adaptive impedance of the balancing impedance such that the amplitude is minimised.

The method may further comprise controlling pass and stop frequencies of the filters of the first and second types, respectively, based on receive and transmit frequencies of current operation of the transceiver arrangement.

According to a fourth aspect, there is provided a computer program comprising computer executable instructions which when executed by a programmable controller of a transceiver arrangement causes the controller to perform the method according to the third aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 1:
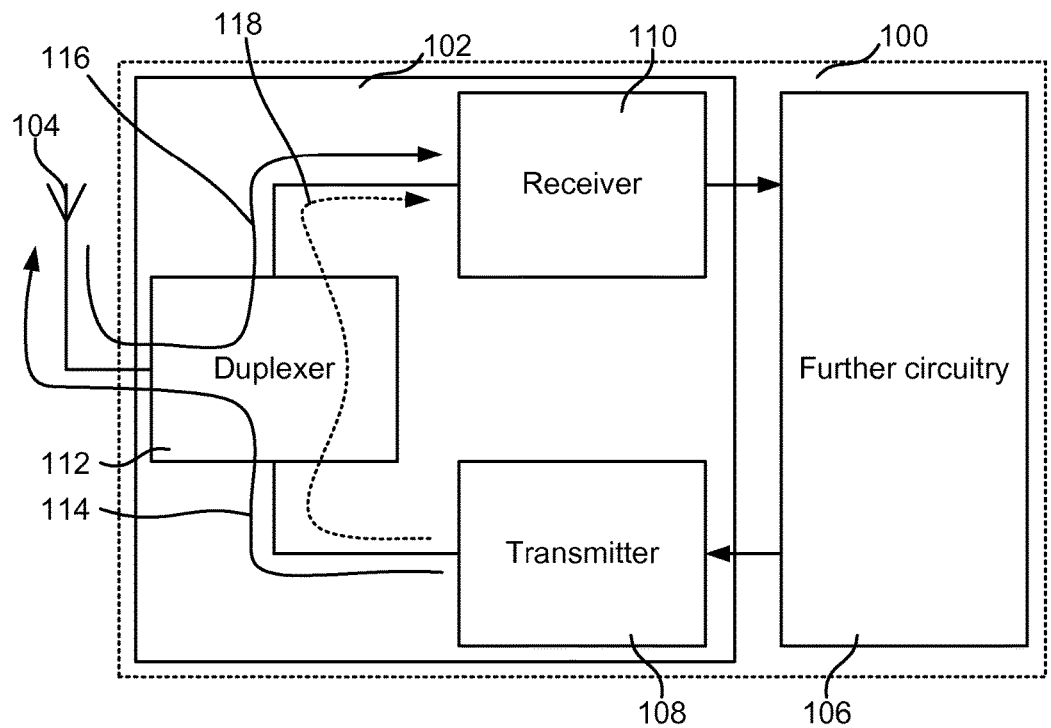
FIG. 1 is a block diagram which schematically illustrates a conventional communication apparatus comprising a transceiver.
Figure 2:
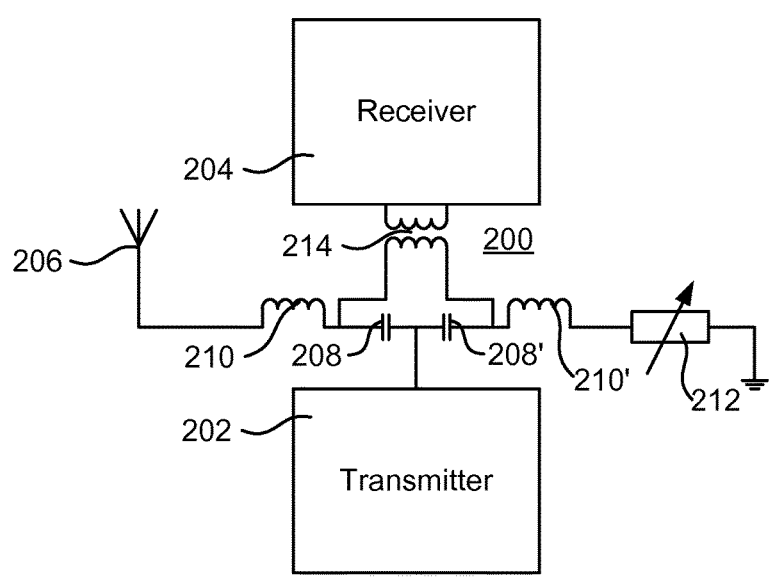
FIG. 2 is a schematic circuit diagram which illustrates an FDD transceiver arrangement with a duplexer based on electrical balance.
Figure 3:
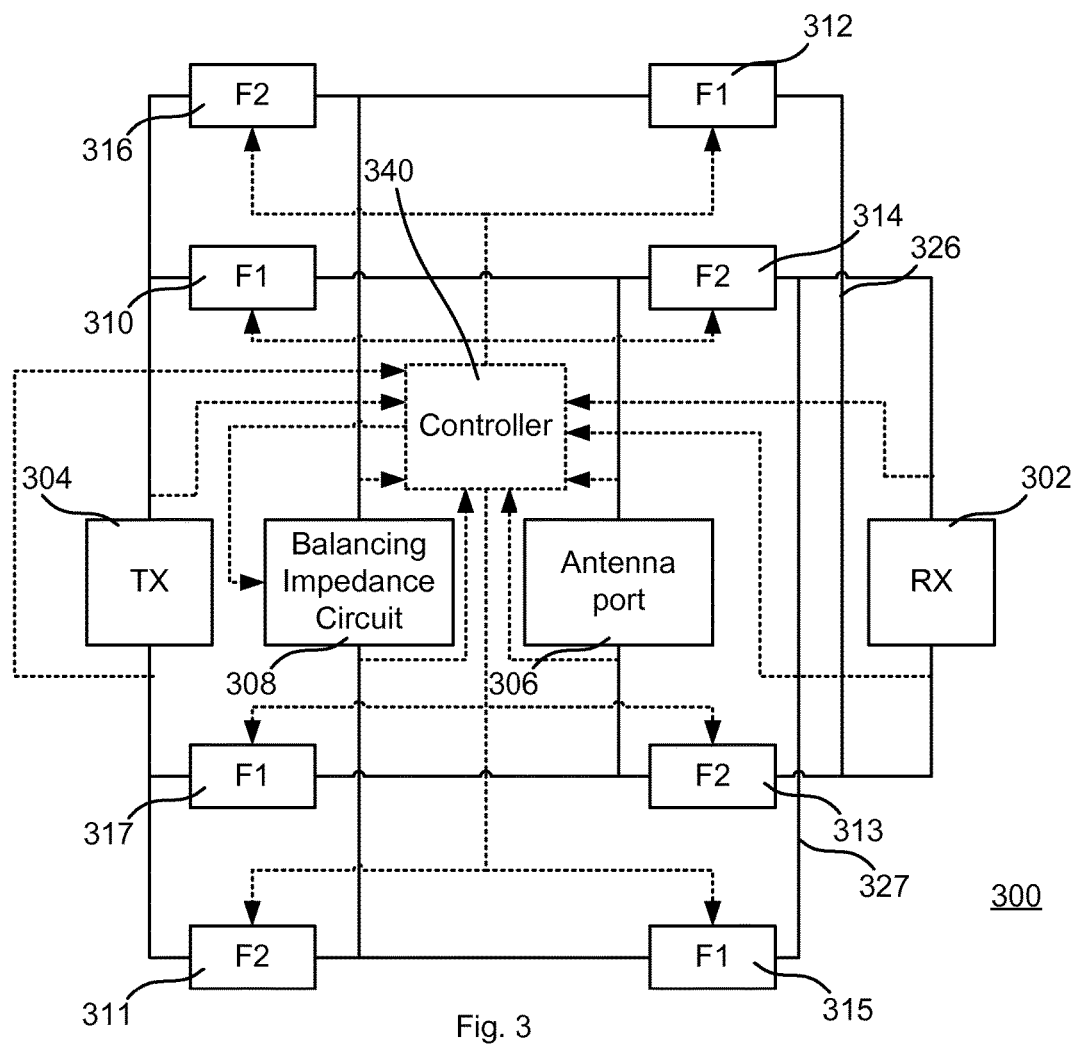
FIG. 3 is a block diagram which schematically illustrates a transceiver according to an embodiment.

FIG. 3 is a block diagram which schematically illustrates a transceiver arrangement 300 according to an embodiment.

The transceiver comprises a receiver 302 arranged for frequency-division duplex communication with a wireless or wired communication network, a transmitter 304 arranged for frequency-division duplex, FDD, communication with the wireless or wired communication network, an antenna port 306 for connecting to an antenna, and a balancing impedance circuit 308 arranged to provide an adaptive impedance arranged to mimic the impedance at the antenna port 306. The balancing impedance circuit 308 can also be referred to as a dummy load mimicking the load presented by the antenna connected to the antenna port 306 at operation. Herein, the term "antenna port" is used for easier understanding and is evident for the example of a wireless transceiver. The term can be substituted by for example the term "cable connection" to provide easier understanding of how the transceivers disclosed herein can be used for wired operation in all the herein given examples. A general term can be "transmission port", which should apply for both wired and wireless operation.

The transceiver arrangement 300 works differentially and has a symmetry between the antenna port 306 and the balancing impedance circuit 308, wherein a portion of the circuitry connected to the balancing impedance circuit 308 to the receiver 302 is cross-connected with respect to the portion of the circuitry connected to the antenna port 306. This provides for cancelling of transmitter signal contribution at receiver input when balancing impedance circuit 308 is perfectly mimicking the impedance at the antenna port 306. Considering that an absolutely perfect mimic of impedance may not be present at all times, the transmitter signal contribution at receiver input is further reduced. This is accomplished by filters 310, 311, 312, 313, 314, 315, 316, 317 that are symmetrically arranged and symmetrically valued with respect to the differential connections. They are however not symmetrical in sense of passing signals from the transmitter towards the antenna port and balancing impedance circuit and passing signals from the antenna port and the balancing impedance circuit towards the receiver, as will be elucidated below.

Filters 310, 312, 315, 317 are of a first type which are arranged to pass signals at transmitting frequency, i.e. the frequency at which the transmitter 304 transmits, and are arranged to attenuate signals at receiving frequency, i.e. the frequency at which the receiver 302 receives desired signals. The transmitting frequency and the receiving frequencies are distinguished since the transceiver 300 is arranged to work with FDD communication.

Filters 311, 313, 314, 316 are of a second type which are arranged to pass signals at the receiving frequency and attenuate signals at the transmitting frequency. Thus, a differential signal at transmitting frequency from the transmitter 304 is passed via filters 310, 317 towards the differential input of the antenna port 306 such that it is enabled to be transmitted efficiently through an antenna connected to the antenna port 306. The transmit signal is attenuated by filters 313, 314 to not cause interference at the input of the receiver 302. The differential transmit signal is attenuated by filters 311, 316 such that only very little transmit energy is wasted in the balancing impedance circuit 308, and also similar transmit energy reaches the receiver 302 via the cross-coupling 326, 327 as through the non cross-coupled path, which reduces interference.

A received signal from an antenna connected to the antenna port 306 reaches the receiver 302 via filters 313, 314 which passes the receiving signal but attenuates the transmit signal which also is present at the antenna port. Input of the receiver 302 is also connected to the balancing impedance circuit 308 via the cross coupling 326, 327 and filters 312, 315, but the filters 312, 315 attenuates the receiving signal wherein very little signal energy of the received signal is wasted in the balancing impedance circuit 308.

Thus, the transceiver 300 provides a structure which efficiently provides signals from the transmitter to the antenna port, efficiently provides signals from the antenna port to the receiver, and at the same time reduces interfering signals from the transmitter to reach the receiver.

Symmetry is desired to keep the aggregate contribution by the transmitter signal at the receiver input close to zero, i.e. cancellation will then occur through the cross coupling 326, 327. This is accomplished by using the same type of filters in the cross-coupled and non cross-coupled paths, and by adapting the impedance of the balancing impedance circuit 308 to mimic the impedance of at the antenna port 306. This can be made by having a controller 340 controlling an adaptive impedance of the balancing impedance circuit 308. Here, although the controller 340 is depicted as a separate element, it can be integrated with the balancing impedance circuit 308.

The controller 340 can comprise circuitry measuring transmitter contribution signal at the input of the receiver 302, as indicated by hashed lines, and provide control to the balancing impedance circuit 308 using a control scheme where the transmitter signal contribution at the receiver input is minimised at all times. For example, an amplitude detector arrangement comprising one or more amplitude detectors can be arranged at a terminal or terminals of an input port of the receiver to measure amplitude. The amplitude is preferably measured at receive frequencies. The controller 340 can thus be provided with input data about signals at receive frequencies to enable it to control the adaptive impedance of the balancing impedance circuit 308 such that the amplitude at terminals of the input port of the receiver 302 is minimised based on measurements of the amplitude detector arrangement. The principle employed is that when this amplitude is as small as possible, the transmitter contribution at receiver input is also as small as possible for any reasonable settings of the filters.

The controller 340 can also be arranged to control the filters 310, 311, 312, 313, 314, 315, 316, 317 such that suitable filter characteristics for passing and attenuating signals as described above are achieved for different frequency constellations of frequencies for transmitting and receiving. For example, if the transceiver operates in FDD where transmit frequency is a certain amount higher than the receive frequency, and the transceiver switches to an operation mode where transceiver operates in FDD where receive frequency is the certain amount higher than the transmit frequency, the controller 340 can swap the properties of filter types F1 and F2. Similar change of respective properties of filters of types F1 and F2 can be made by the controller 340 upon change of the certain amount of frequency difference between receive and transmit frequencies, etc.

While the embodiment demonstrated with reference to FIG. 3 is suitable for ports with differential input/output, the embodiment demonstrated with reference to FIG. 4 below is suitable for ports with single-ended input/output.

Figure 4:
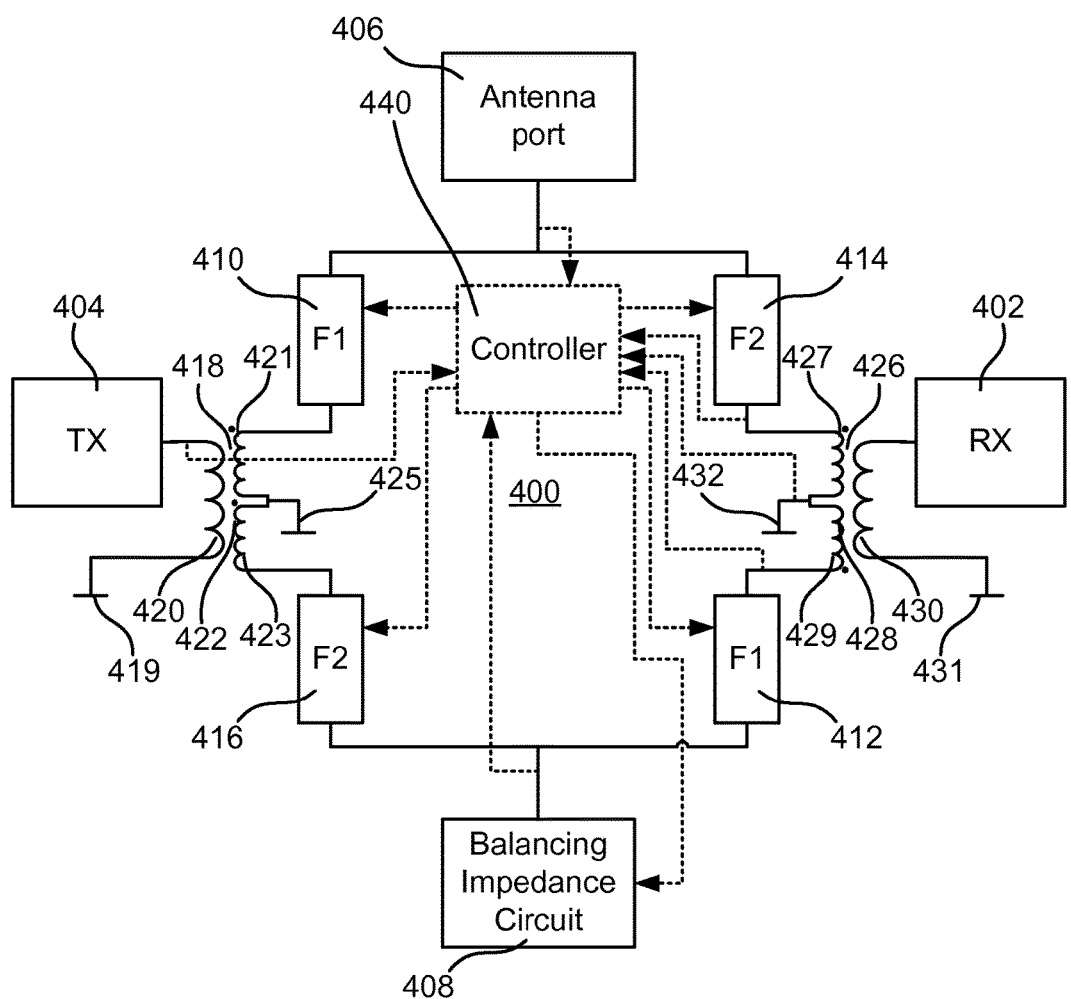
FIG. 4 is a block diagram which schematically illustrates a transceiver according to an embodiment.

FIG. 4 is a block diagram which schematically illustrates a transceiver arrangement 400 according to an embodiment. The transceiver comprises a receiver 402 arranged for frequency-division duplex communication with a wireless or wired communication network, a transmitter 404 arranged for frequency-division duplex, FDD, communication with the wireless or wired communication network, an antenna port 406 for connecting to an antenna in a wireless network or a cable in a wired connection, and a balancing impedance circuit 408 arranged to provide an adaptive impedance arranged to mimic the impedance at the antenna port 406. The balancing impedance circuit 408 can also be referred to as a dummy load mimicking the load presented by the antenna connected to the antenna port 406 at operation.

The transceiver arrangement 400 has a symmetry between the antenna port 406 and the balancing impedance circuit 408, wherein a portion of the circuitry connecting the balancing impedance circuit 408 to the receiver 402 is cross-connected with respect to the portion of the circuitry connected to the antenna port 406 by arrangement of transformers 418, 426 conveying signals from/to a transmitter 404/receiver 402, respectively. The cross-connection is accomplished by arrangement of windings denoted by the dots at windings 421, 423, 427, 429. This provides for cancelling of transmitter signal contribution at receiver input when balancing impedance circuit 408 is perfectly mimicking the impedance at the antenna port 406. Considering that an absolutely perfect mimic of impedance may not be present at all times, the transmitter signal contribution at receiver input is further reduced. This is accomplished by filters 410, 412, 414, 416 that are symmetrically arranged and symmetrically valued with respect to the differential connections. They are however not symmetrical in sense of passing signals from the transmitter towards the antenna port and balancing impedance circuit and passing signals from the antenna port towards the receiver, as will be elucidated below.

Filters 410, 412 are of a first type which are arranged to pass signal at transmitting frequency, i.e. the frequency at which the transmitter 404 transmits, and are arranged to attenuate signals at receiving frequency, i.e. the frequency at which the receiver 402 receives desired signals. The transmitting frequency and the receiving frequencies are distinguished since the transceiver 400 is arranged to work with FDD communication.

Filters 414, 416 are of a second type which are arranged to pass signals at the receiving frequency and attenuate signals at the transmitting frequency. Thus, a single-ended signal at transmitting frequency from the transmitter 404 is passed via filter 410 towards the single-ended input of the antenna port 406 such that it is enabled to be transmitted efficiently through an antenna connected to the antenna port 406. The transmit signal is attenuated by filter 414 to not cause interference at the input of the receiver 402. The transmit signal is attenuated by filter 416 such that only very little transmit energy is wasted in the balancing impedance circuit 408, and also a similar amount of transmit signal reaches coil 429 as coil 427, which reduces interference to the receiver 402.

A received signal from an antenna connected to the antenna port 406 reaches the receiver 402 via filter 414 which passes the receiving signal but attenuates the transmit signal which also is present at the antenna port 406. Input of the receiver 402 is also connected to the balancing impedance circuit 408 via filters 412, but the filter 412 attenuates the receiving signal wherein very little signal energy of the received signal is wasted in the balancing impedance circuit 408.

Thus, the transceiver 400 provides a structure which efficiently provides signals from the transmitter to the antenna port, efficiently provides signals from the antenna port to the receiver, and at the same time reduces interfering signals from the transmitter to the receiver.

Symmetry is desired to keep the aggregate contribution by the transmitter signal at the receiver input close to zero, i.e. cancellation will then occur through the cross coupling achieved by the arrangement of transformers 418, 426, which will be further elucidated below. This is accomplished by using the same type of filters in the path of the antenna port and the path of the balancing impedance circuit, and by adapting the impedance of the balancing impedance circuit 408 to mimic the impedance of at the antenna port 406. This can be made by having a controller 440 controlling an adaptive impedance of the balancing impedance circuit 408. Here, although the controller 440 is depicted as a separate element, it can be integrated with the balancing impedance circuit 408.

The controller 440 can comprise circuitry measuring transmitter contribution signal at the input of the receiver 402, and provide control to the balancing impedance circuit 408 using a control scheme where the transmitter signal contribution at the receiver input is minimised at all times. For example, an amplitude detector arrangement comprising one or more amplitude detectors can be arranged at a terminal or terminals of an input port of the receiver 402 or at terminals of the primary winding 428. The amplitude is preferably measured at receive frequencies. The controller 440 can thus be provided with input data about signals at receive frequencies to enable it to control the adaptive impedance of the balancing impedance circuit 408 such that the amplitude at the terminal or terminals of an input port of the receiver 402 or at terminals of the primary winding 428 is minimised based on measurements by the amplitude detector arrangement.

The controller 440 can also be arranged to control the filters 410, 412, 414, 416 such that suitable filter characteristics for passing and attenuating signals as described above are achieved for different frequency constellations of frequencies for transmitting and receiving.

The transformer 418 is arranged to convey signals from the transmitter 404 towards the antenna port 406, but also to the rest of the symmetrical circuit as elucidated above. The transformer 418 comprises a primary winding 420 connected between a single-ended output of the transmitter 404 and a reference voltage point 419. In case the transmitter 404 has a differential output, the winding 420 is connected between the differential output terminals of the transmitter 404. The transformer further has a secondary winding 422 connected between the filter 410 and the filter 416. The secondary winding 422 comprises a first partial winding 421 and a second partial winding 423 wherein the first partial winding is connected between the filter 410 and a reference voltage point 425, and the second partial winding is connected between the reference voltage point 425 and the filter 416.

The transformer 426 is arranged to convey signals from the antenna port 406, towards the receiver 402 but also connect the receiver to the rest of the symmetrical circuit as elucidated above. The transformer 426 comprises a primary winding 428 connected between the filter 412 and the filter 414. The primary winding 428 comprises a first partial winding 427 and a second partial winding 429 wherein the first partial winding 427 is connected between the filter 414 and a reference voltage point 432, and the second partial winding 429 is connected between the reference voltage point 432 and the filter 412. The transformer further has a secondary winding 430 connected between a single-ended input of the receiver 402 and a reference voltage point 431.

In case the receiver 402 has a differential input, the winding 430 is connected between the differential input terminals of the receiver 402.

The mutual relation between the first and second partial windings 421, 423; 427, 429 of the transformers 418, 426 in sense of orientation provides for the cross-connection or cross-coupling to enable zeroing or reducing transmitter contribution at receiver input, as elucidated above. The illustrated orientations in FIG. 4 only indicate one feasible orientation constellation, while other constellations providing the similar cross-connection or cross-coupling of the signals are equally feasible.

Figure 5:
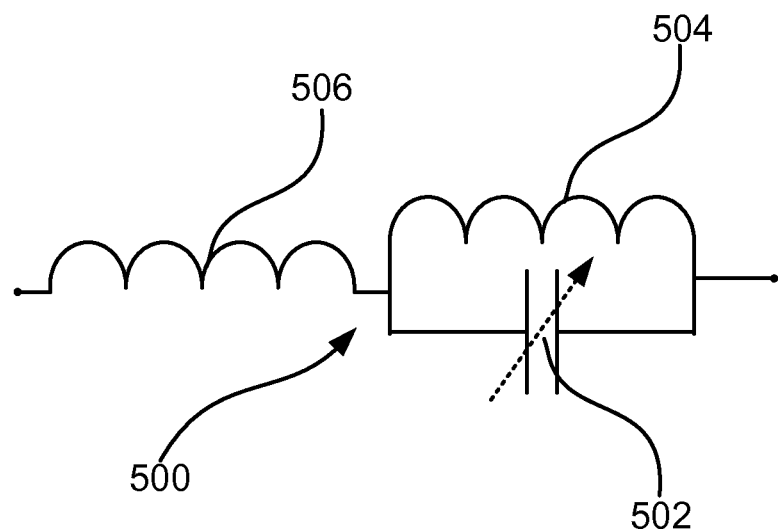
FIG. 5 illustrates a filter according to an embodiment.

The filters in the different embodiments demonstrated above can be made more or less complex, and with different constraints on performance. Simple filters comprising single capacitors or inductors may be used, but may not fulfill the demands of constraints set up. High-order filters may on the other hand introduce other problems, and/or cost/space issues. FIG. 5 illustrates a filter 500 according to an embodiment, which provides dual resonance properties where high insertion loss is provided at one frequency and low insertion loss is provided at another frequency not far from the first frequency, that has been found a reasonable compromise for at least some of the embodiments. It comprises an inductance 504 coupled in parallel with a capacitance 502, wherein the parallel coupling 502, 504 is coupled in series with an inductance 506 between the input and output of the filter 500. It provides a parallel resonance, attenuating the signal at a frequency below a series resonance where the signal is passed.

Figure 6:
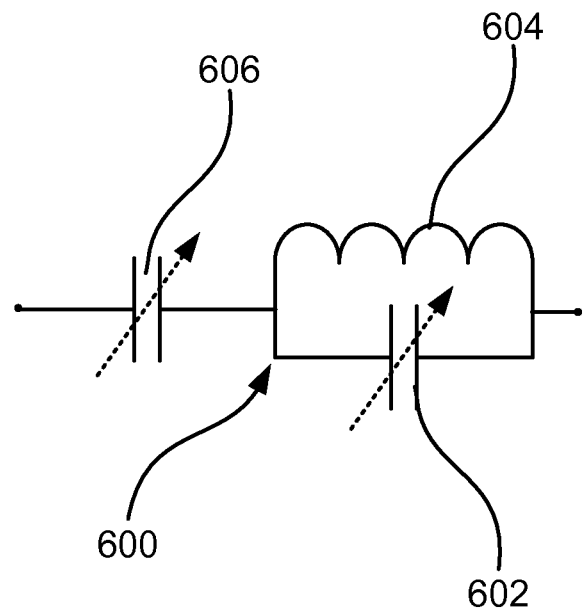
FIG. 6 illustrates a filter according to an embodiment.

FIG. 6 illustrates a filter 600 according to an embodiment, which corresponds to the filter demonstrated with reference to FIG. 5, but with the difference that the parallel coupling 602, 604 is coupled in series with a capacitance 606 between the input and output of the filter 600, and that it provides a series resonance frequency below the parallel resonance frequency.

Depending on whether receiving frequency is higher or lower than the transmitting frequency, the filters of the first type can be selected as one of the types illustrated in FIG. 5 or 6, and the filters of the second type are then selected as the other one of the types illustrated in FIG. 5 or 6.

For the controlling of filter properties as demonstrated above, an efficient way is to let the controller 340, 440 control the capacitance values of capacitances 502, 602, 606 of the filters, e.g. by having the capacitances 502, 602, 606 as controllable capacitance banks. It is of course also possible to control inductors 506, 504, 604.

Figure 7:
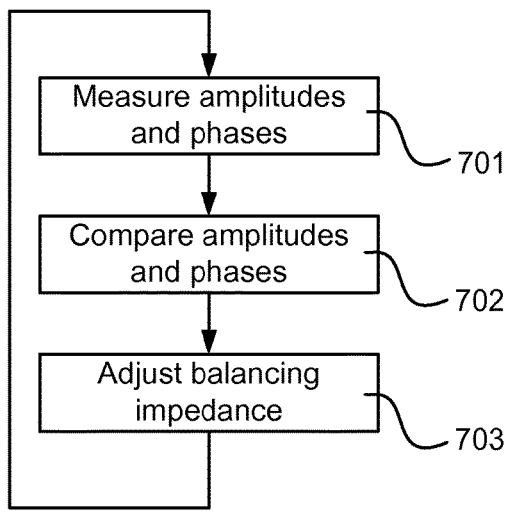
FIG. 7 is a flow chart which schematically illustrates a method according to embodiments.

FIG. 7 is a flow chart which schematically illustrates a method according to embodiments for controlling the balancing impedance circuit. The method includes measuring TX signals at the receiver. Since the balancing impedance circuit should mimic the antenna port, an adaptive impedance of the balancing impedance circuit is adjusted 703 such that TX signal at the receiver is minimised. To support the adaptation, the TX signal can also be measured at the dummy load and/or the antenna port and/or the TX output. The additional information will allow good cancellation to be reached, e.g. in fewer iterations. The control according to the method is operating continuously since impedance at antenna port can change over time, e.g. due to antenna environment. Continuously should in this context not be interpreted as an opposite to time-discrete since the control mechanism can be both a clocked process or a time-continuous process, but should be construed as the adaptation of the impedance of the balancing impedance circuit is updated over time to follow any impedance change at the antenna port.

Figure 8:
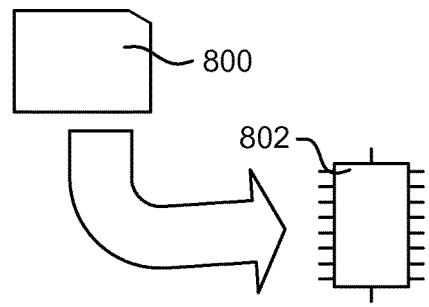
FIG. 8 schematically illustrates a computer program and a processor.

FIG. 8 schematically illustrates a computer program and a processor. The method according to the present invention is suitable for implementation with aid of processing means, such as computers and/or processors, especially for the case where the controller of the balancing impedance circuit is implemented as processor or programmable circuit. Therefore, there is provided computer programs, comprising instructions arranged to cause the processing means, processor, or computer to perform the steps of any of the methods according to any of the embodiments described with reference to FIG. 7. The computer programs preferably comprises program code which is stored on a computer readable medium 800, as illustrated in FIG. 8, which can be loaded and executed by a processing means, processor, or computer 802 to cause it to perform the methods, respectively, according to embodiments of the present invention, preferably as any of the embodiments described with reference to FIG. 7. The computer 802 and computer program product 800 can be arranged to execute the program code sequentially where actions of the any of the methods are performed stepwise. The processing means, processor, or computer 802 is preferably what normally is referred to as an embedded system. Thus, the depicted computer readable medium 800 and computer 802 in FIG. 8 should be construed to be for illustrative purposes only to provide understanding of the principle, and not to be construed as any direct illustration of the elements.

Figure 9:
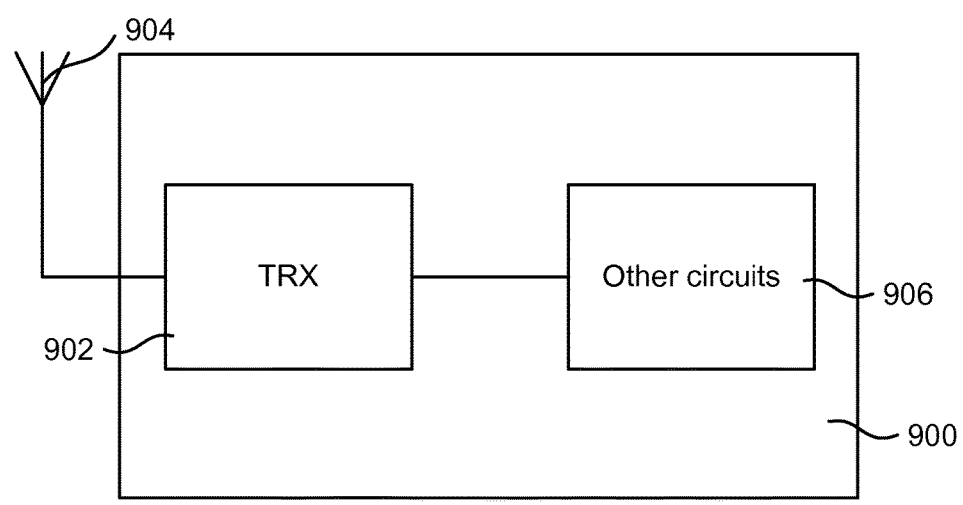
FIG. 9 is a block diagram schematically illustrating a communication device.

FIG. 9 is a block diagram schematically illustrating a communication device 900. The communication device 900 is capable of frequency division duplex communication via a communication network. The communication device 900 comprises a transceiver arrangement 902 according to any of the above demonstrated. The transceiver arrangement 902 is connected to an antenna 904 through its antenna port. The communication device can also comprise other circuits 906, such as interface towards a user and/or other circuitry or machines, memory, processor, etc. The communication device 900 can be a smartphone or cellphone, a communication card or device in or for a computer, an embedded communication device in a machine, or the like. The communication device 900 can be adapted for cellular communication, point-to-point communication, or for communication in a wireless or wired network.

The antenna port described above need not necessarily by connected to an antenna, but can equally be connected to a wired line which conveys radio frequency signals. Thus, the communication device 900 described with reference to FIG. 9 need not comprise the antenna 904 wherein the communication device is instead connected to such a wired line conveying radio frequency signals.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A transceiver arrangement, comprising:
  a receiver configured for frequency-division duplex communication with a communication network;
  a transmitter configured for frequency-division duplex communication with the communication network;
  a transmission port for connecting to an antenna;

a balancing impedance circuit configured to provide an adaptive impedance to mimic the impedance at the transmission port;

a filtering arrangement, the filtering arrangement comprising filters of a first type and filters of a second type, connecting the receiver, transmitter, transmission port, and balancing impedance circuit;

wherein the filters of the first type are configured to pass signals at a transmitter frequency and attenuate signals at a receiver frequency, and are connected between the transmitter and the transmission port and between the receiver and the balancing impedance circuit;

wherein the filters of the second type are configured to attenuate signals at the transmitter frequency and pass signals at the receiver frequency, and are connected between the transmitter and the balancing impedance circuit and between the receiver and the transmission port.

2. The transceiver arrangement of claim 1, further comprising a connection network, which includes a differential cross-connection and the filtering arrangement, differentially connecting the receiver, transmitter, transmission port and balancing impedance circuit.

3. The transceiver arrangement of claim 2:
further comprising an amplitude detector arrangement at terminals of an input port of the receiver;
wherein the transceiver arrangement further comprises a controller configured to control the adaptive impedance of the balancing impedance circuit such that the amplitude at terminals of the input port of the receiver is minimized based on measurements of the amplitude detector arrangement.

4. The transceiver arrangement of claim 1, further comprising a connection network which includes the filtering arrangement connecting the receiver, transmitter, transmission port and balancing impedance circuit by:
a first transformer arrangement having:
a primary winding connected to the transmitter; and
a secondary winding connected via one of the filters of the first type to a terminal of the transmission port and via one of the filters of the second type to a terminal of the balancing impedance circuit; and
a second transformer arrangement having:
a primary winding connected to another one of the filters of the second type, which filter is connected to the terminal of the transmission port, and to another one of the filters of the first type, which filter is connected to the terminal of the balancing impedance circuit; and
a secondary winding connected to the receiver.

5. The transceiver arrangement of claim 4, wherein:
the primary winding of the first transformer arrangement is connected between a single-ended output of the transmitter and a first reference voltage point;
the secondary winding of the first transformer arrangement comprises:
a first partial winding connected between the filter of the first type and a second reference voltage point, and
a second partial winding connected between the filter of the second type and the second reference voltage point.

6. The transceiver arrangement of claim 4, wherein:
the secondary winding of the second transformer arrangement is connected between a single-ended input of the receiver and a third reference voltage point;
the primary winding of the second transformer arrangement comprises:
a first partial winding connected between the filter of the first type and a fourth reference voltage point;
a second partial winding connected between the filter of the second type and the fourth reference voltage point.

7. The transceiver arrangement of claim 6, wherein:
the primary winding of the first transformer arrangement is connected between a single-ended output of the transmitter and a first reference voltage point;
the secondary winding of the first transformer arrangement comprises:
a first partial winding connected between the filter of the first type and a second reference voltage point, and
a second partial winding connected between the filter of the second type and the second reference voltage point;
the first and second partial windings of one of the first and second transformer arrangements are wound to give mutually aggregate magnetic field;
wherein the first and second partial windings of the other one of the first and second transformer arrangements are wound to give mutually opposite magnetic field.

8. The transceiver arrangement of claim 4:
further comprising an amplitude detector arrangement at a terminal or terminals of an input port of the receiver or at terminals of the primary winding of the second transformer arrangement;
further comprising a controller configured to control the adaptive impedance of the balancing impedance circuit such that the amplitude at the terminal or terminals of an input port of the receiver or at terminals of the primary winding of the second transformer arrangement is minimized based on measurements by the amplitude detector arrangement.

9. The transceiver arrangement of claim 1, wherein:
the filters of the first type each comprise a capacitance and a first inductance coupled in parallel, where the parallel coupling is coupled in series with a second inductance;
the filters of the second type each comprise a first capacitance and an inductance coupled in parallel, where the parallel coupling is coupled in series with a second capacitance.

10. The transceiver arrangement of claim 9, wherein:
at least one of the capacitance and the first and second inductances of each of the filters of the first type are controllable and are controlled by a controller;
at least one of the inductance and the first and second capacitances of each of the filters of the second type are controllable and are controlled by the controller.

11. The transceiver arrangement of claim 1, wherein:
the filters of the first type each comprise a first capacitance and an inductance coupled in parallel, where the parallel coupling is coupled in series with a second capacitance;
the filters of the second type each comprise a capacitance and a first inductance coupled in parallel where the parallel coupling is coupled in series with a second inductance.

12. The transceiver arrangement of claim 11, wherein:
at least one of the inductance and the first and second capacitances of each of the filters of the first type are controllable and are controlled by a controller;

at least one of the capacitance and the first and second inductances of each of the filters of the second type are controllable and are controlled by the controller.

13. A communication device, capable of frequency division duplex communication via a communication network, the communication device comprising:
a transceiver arrangement, the transceiver arrangement comprising:
a receiver configured for frequency-division duplex communication with a communication network;
a transmitter configured for frequency-division duplex communication with the communication network;
a transmission port for connecting to an antenna;
a balancing impedance circuit configured to provide an adaptive impedance to mimic the impedance at the transmission port; and
a filtering arrangement, the filtering arrangement comprising filters of a first type and filters of a second type, connecting the receiver, transmitter, transmission port, and balancing impedance circuit;
wherein the filters of the first type are configured to pass signals at a transmitter frequency and attenuate signals at a receiver frequency, and are connected between the transmitter and the transmission port and between the receiver and the balancing impedance circuit;
wherein the filters of the second type are configured to attenuate signals at the transmitter frequency and pass signals at the receiver frequency, and are connected between the transmitter and the balancing impedance circuit and between the receiver and the transmission port.

14. A method of controlling a transceiver arrangement; the transceiver arrangement comprising a receiver configured for frequency-division duplex communication with a communication network, a transmitter configured for frequency-division duplex communication with the communication network, an transmission port for connecting to an antenna, a balancing impedance circuit configured to provide an adaptive impedance configured to mimic the impedance at the transmission port, and a filtering arrangement; the filtering arrangement comprising filters of a first type and filters of a second type, connecting the receiver, transmitter, transmission port and balancing impedance circuit; wherein the filters of the first type are configured to pass signals at a transmitter frequency and attenuate signals at a receiver frequency and are connected between the transmitter and the transmission port and between the receiver and the balancing impedance circuit, wherein the filters of the second type are configured to attenuate signals at the transmitter frequency and pass signals at the receiver frequency and are connected between the transmitter and the balancing impedance circuit and between the receiver and the transmission port; the method comprising:
measuring amplitude at terminals of an input port of the receiver; and
adjusting the adaptive impedance of the balancing impedance such that the amplitude is minimized.

15. The method of claim 14, further comprising controlling pass and stop frequencies of the filters of the first and second types, respectively, based on receive and transmit frequencies of current operation of the transceiver arrangement.

16. A computer program product stored in a non-transitory computer readable medium for controlling a transceiver arrangement; the transceiver arrangement comprising a receiver configured for frequency-division duplex communication with a communication network, a transmitter configured for frequency-division duplex communication with the communication network, an transmission port for connecting to an antenna, a balancing impedance circuit configured to provide an adaptive impedance configured to mimic the impedance at the transmission port, and a filtering arrangement; the filtering arrangement comprising filters of a first type and filters of a second type, connecting the receiver, transmitter, transmission port and balancing impedance circuit; wherein the filters of the first type are configured to pass signals at a transmitter frequency and attenuate signals at a receiver frequency and are connected between the transmitter and the transmission port and between the receiver and the balancing impedance circuit, wherein the filters of the second type are configured to attenuate signals at the transmitter frequency and pass signals at the receiver frequency and are connected between the transmitter and the balancing impedance circuit and between the receiver and the transmission port; the computer program product comprising software instructions which, when run on a processing circuit, causes the processing circuit to control the transceiver arrangement by:
measuring amplitude at terminals of an input port of the receiver; and
adjusting the adaptive impedance of the balancing impedance such that the amplitude is minimized.

* * * * *